US012620318B2

(12) United States Patent
Arteaga

(10) Patent No.: US 12,620,318 B2
(45) Date of Patent: May 5, 2026

(54) ARTIFICIAL INTELLIGENCE CO-PILOT FOR MANNED AND UNMANNED AIRCRAFT

(71) Applicant: Ricardo Alejandro Arteaga, Lancaster, CA (US)

(72) Inventor: Ricardo Alejandro Arteaga, Lancaster, CA (US)

( * ) Notice: Subject to any disclaimer, the term of this patent is extended or adjusted under 35 U.S.C. 154(b) by 391 days.

(21) Appl. No.: 18/132,417

(22) Filed: Apr. 9, 2023

(65) Prior Publication Data

US 2024/0339039 A1 Oct. 10, 2024

(51) Int. Cl.

*G08G 5/50* (2025.01)
*G08G 5/21* (2025.01)
*G08G 5/55* (2025.01)
*G10L 25/30* (2013.01)
*G10L 25/48* (2013.01)

(52) U.S. Cl.

CPC ................ *G08G 5/50* (2025.01); *G08G 5/21* (2025.01); *G08G 5/55* (2025.01); *G10L 25/30* (2013.01); *G10L 25/48* (2013.01)

(58) Field of Classification Search

CPC ... G10L 15/22; G10L 15/26; G10L 2015/223; G08G 5/21

See application file for complete search history.

(56) References Cited

U.S. PATENT DOCUMENTS

| | | | | |
|---|---|---|---|---|
| 11,862,031 | B1 * | 1/2024 | George | G08G 5/727 |
| 11,874,127 | B1 * | 1/2024 | Love | G06Q 50/40 |
| 2018/0364707 | A1 * | 12/2018 | Bosworth | B64D 45/0056 |
| 2019/0090800 | A1 * | 3/2019 | Bosworth | A61B 5/0015 |
| 2020/0143699 | A1 * | 5/2020 | Pashayev | G09B 9/307 |
| 2020/0285996 | A1 * | 9/2020 | Janakiraman | G06N 7/01 |
| 2021/0312927 | A1 * | 10/2021 | Baladhandapani | G08G 5/26 |
| 2023/0245651 | A1 * | 8/2023 | Wang | G06N 5/022 704/275 |
| 2024/0249726 | A1 * | 7/2024 | Boswell | G10L 15/32 |
| 2025/0037587 | A1 * | 1/2025 | Diaz-Pineda | G06N 3/092 |

* cited by examiner

*Primary Examiner* — Mark Villena

(57) ABSTRACT

An Artificial Intelligence Co-pilot method and systems that encompasses a range of advanced technologies and methodologies, all focused on enhancing flight safety and efficiency. By integrating AI into the cockpit, we can significantly reduce the potential for human error and empower pilots to make better, more informed decisions in real-time. The AI Co-Pilot System is a sophisticated solution designed to support human pilots to Aviate, Navigate, and Communicate and in managing aircraft operations by processing voice commands and inquiries. It employs advanced (CHATGPT) Natural Language Processing (NLP) and Human-Machine Interface (HMI) technologies to establish seamless interaction between the pilot and the aircraft system, ultimately enhancing navigation, safety, and overall flight performance.

7 Claims, 13 Drawing Sheets

ARTIFICIAL INTELLIGENCE CO-PILOT FOR MANNED AND UNMANNED AIRCRAFT

ORIGIN OF THE INVENTION

U.S. Non-Provisional patent application Ser. No. 18/132,417, filed 9 Apr. 2023.

BACKGROUND OF THE INVENTION

1. Field of the Invention

The present invention discloses an Artificial Intelligence Co-pilot assistance to assist human pilots during complex and high-workload scenarios. More specifically, the invention is an Artificial Intelligence method and system for use by aircraft for manned and unmanned aircrafts.

2. Description of the Related Art

Natural Language Processing (NLP): AI-based virtual co-pilots rely on advanced NLP techniques to understand and process pilot commands, facilitating seamless communication between pilots and the AI assistant. These systems can interpret spoken language, generate human-like responses, and even translate instructions into machine-readable formats for interaction with aircraft systems.

Machine Learning (ML) and Deep Learning (DL): Virtual co-pilots employ ML and DL algorithms to continuously improve their performance, adapt to new situations, and make real-time decisions. These AI systems can learn from past experiences, identify patterns, and make recommendations based on the current context, ensuring that they provide relevant and timely decision support.

Sensor Fusion and Data Analytics: AI assistant co-pilots integrate and process data from various sensors and aircraft systems to provide comprehensive situational awareness. By combining information from multiple sources, these systems can make more accurate and informed decisions, helping pilots navigate challenging scenarios and respond effectively to changing conditions.

Human-Machine Interface (HMI): A key component of AI assistant co-pilot systems is the HMI, which facilitates interaction between pilots and the AI. Advanced HMI designs incorporate voice recognition, touch interfaces, and graphical displays to ensure that pilots can easily access and understand the AI's recommendations, enabling seamless collaboration and decision-making.

SUMMARY OF THE INVENTION

Accordingly, it is an object of the present invention to provide an AI assistant co-pilot method and systems encompasses a range of advanced technologies and methodologies, all focused on enhancing flight safety and efficiency. By integrating AI into the cockpit, we can significantly reduce the potential for human error and empower pilots to make better, more informed decisions in real-time. This breakthrough technology has the potential to revolutionize the aviation industry, paving the way for a new era of safer, smarter, and more reliable air travel.

Another object of the present invention is to provide an AI Drone ChatGPT method and system for unmanned for autonomous swarm operations.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

Figure 10:
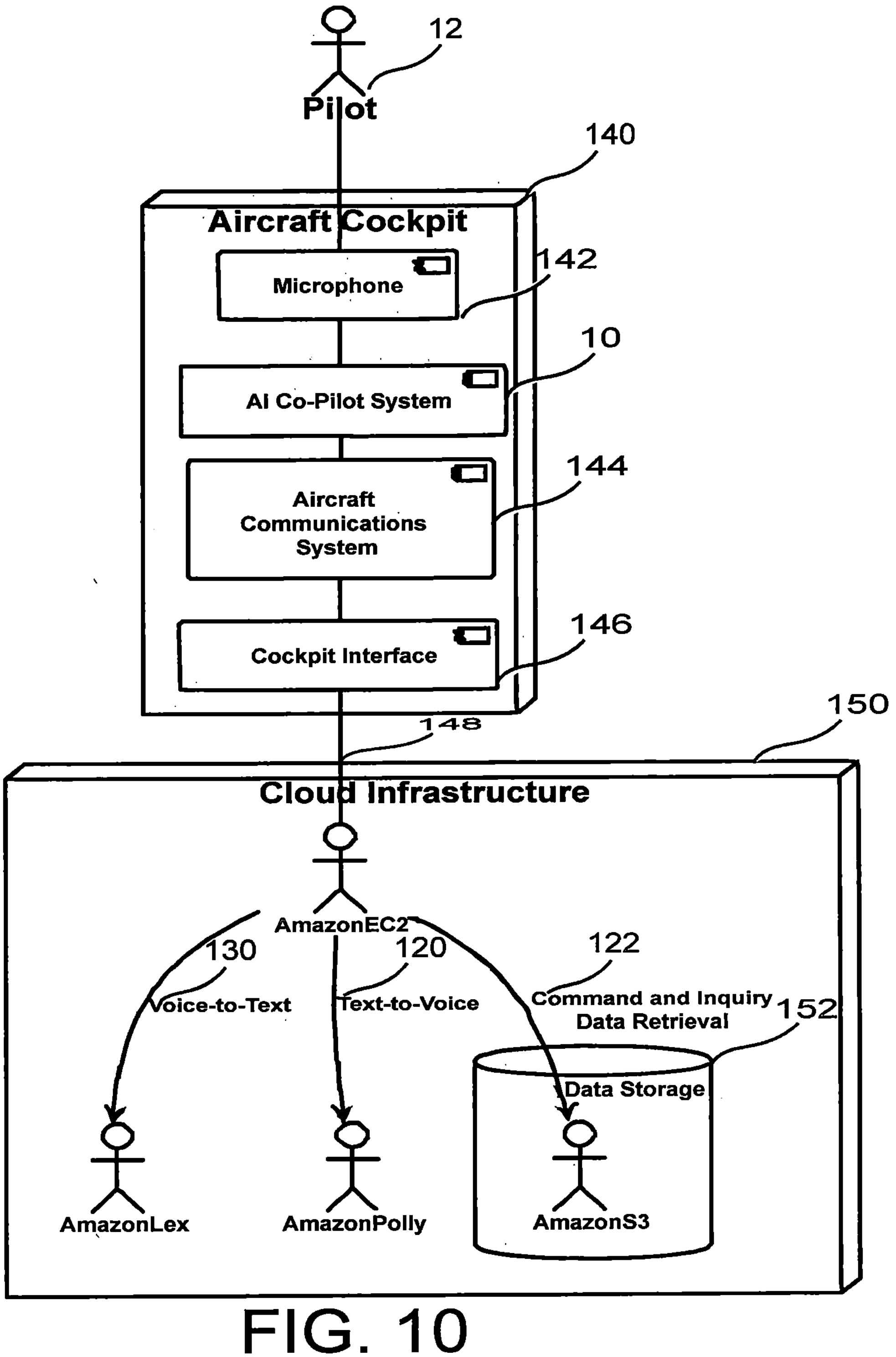
Figure 11:
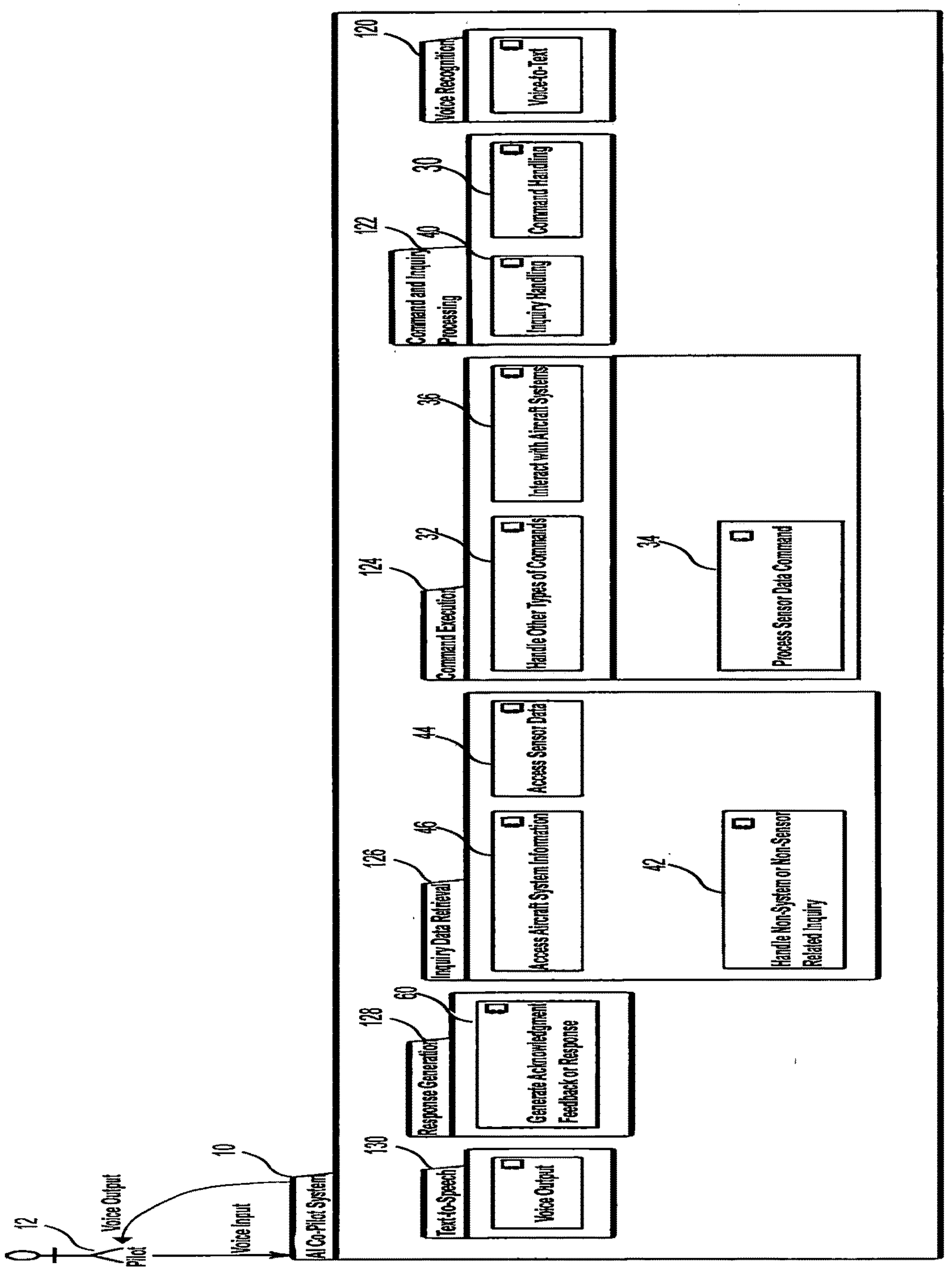

FIG. 10 is a deployment diagram that represents the physical deployment of artifacts on nodes, such as hardware devices, processors, or servers of a user (pilot) making a command to the AI co-pilot in accordance with an embodiment of the present invention; and FIG. 11 is a package diagram that represents a use case of a user (pilot) making a command to the AI co-pilot in accordance with an embodiment of the present invention.

Figure 12:
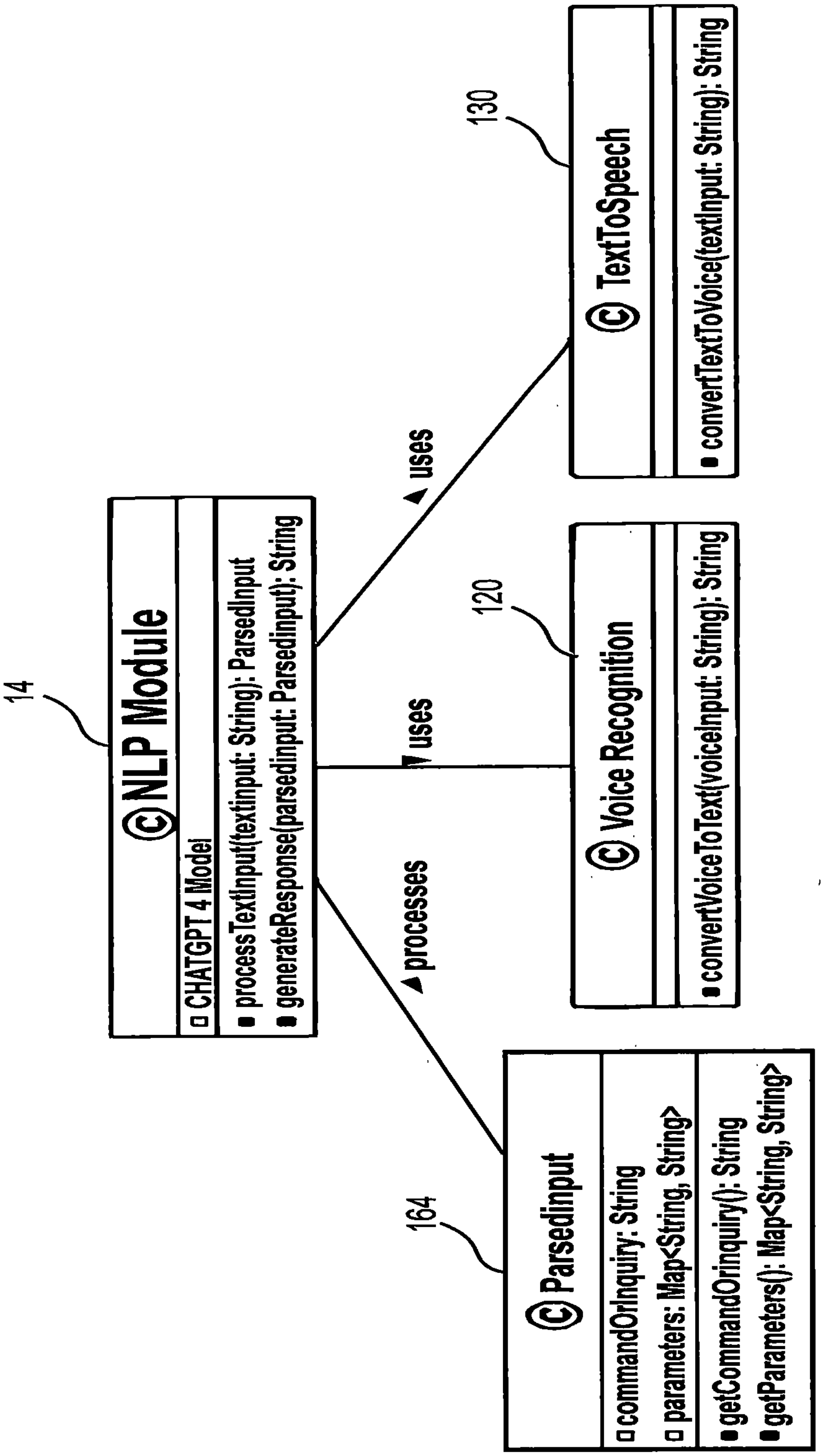

FIG. 12 is an NLP class diagram that represents a use case of a user (pilot) making a command to the AI co-pilot in accordance with an embodiment of the present invention.

Figure 13:
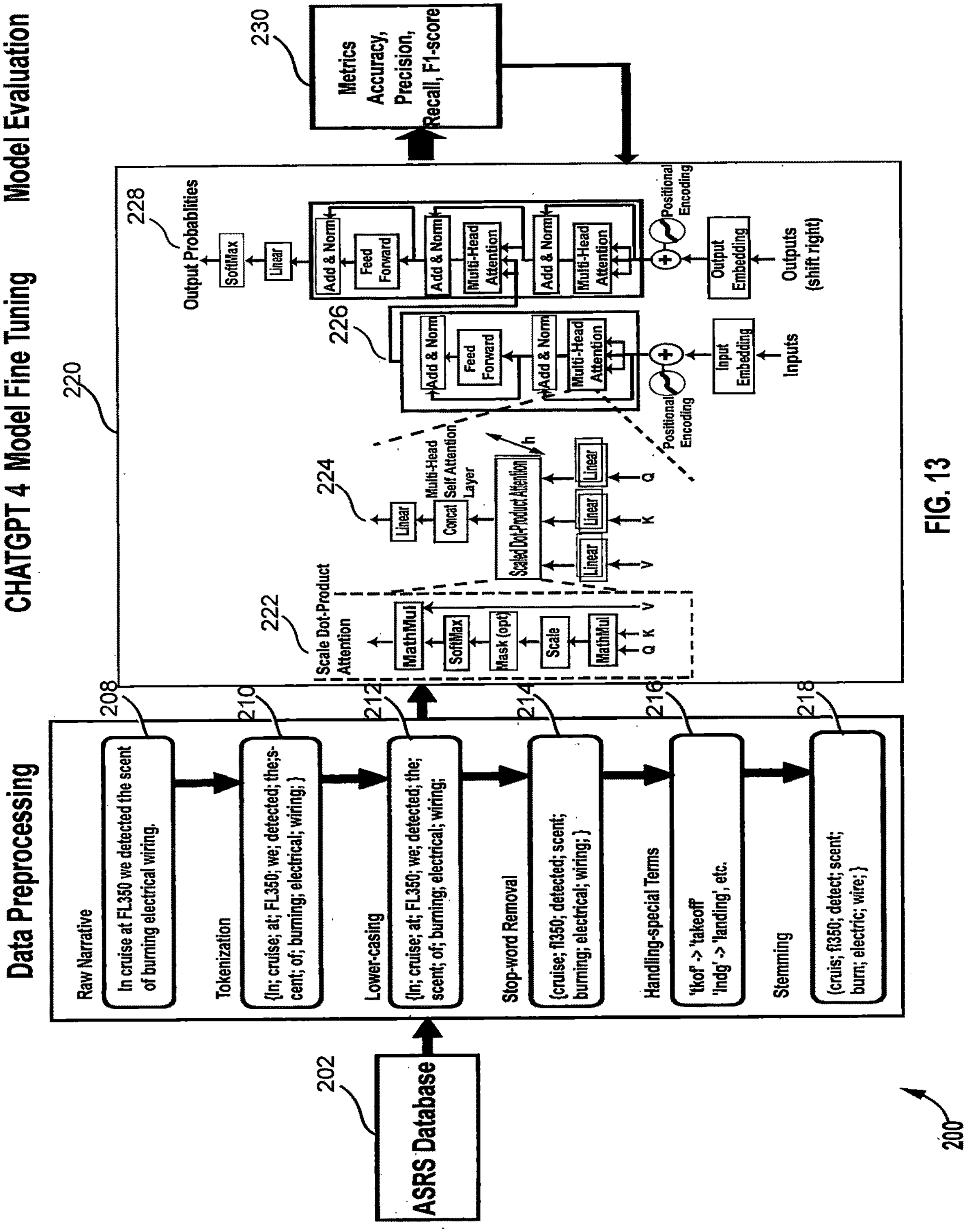

FIG. 13 represents a methodology of the Data Preprocessing and Model Training of a fine-tune CHATGPT 4 for a user (pilot) making a command to the AI co-pilot in accordance with an embodiment of the present invention.

DESCRIPTION OF THE PREFERRED EMBODIMENT(S)

The present invention provides a new AI method and systems for manned and unmanned aircraft. The new methodology is implemented using a number of system elements onboard an aircraft. Depending on the type of aircraft, some of the system elements can already exist onboard the aircraft, some of the system elements can require modification of existing aircraft hardware, and/or some of the system elements can comprise new hardware and software. Accordingly, it is to be understood that the AI methods described herein could be implemented by a variety of systems without departing from the scope of the present invention.

The AI Co-Pilot System 10 is a sophisticated solution designed to support human pilots to Aviate, Navigate, and Communicate and in managing aircraft operations by processing voice commands and inquiries. It employs advanced Natural Language Processing (NLP) and Human-Machine Interface (HMI) technologies to establish seamless interaction between the pilot and the aircraft system, ultimately enhancing navigation, safety, and overall flight performance.

Figure 3:
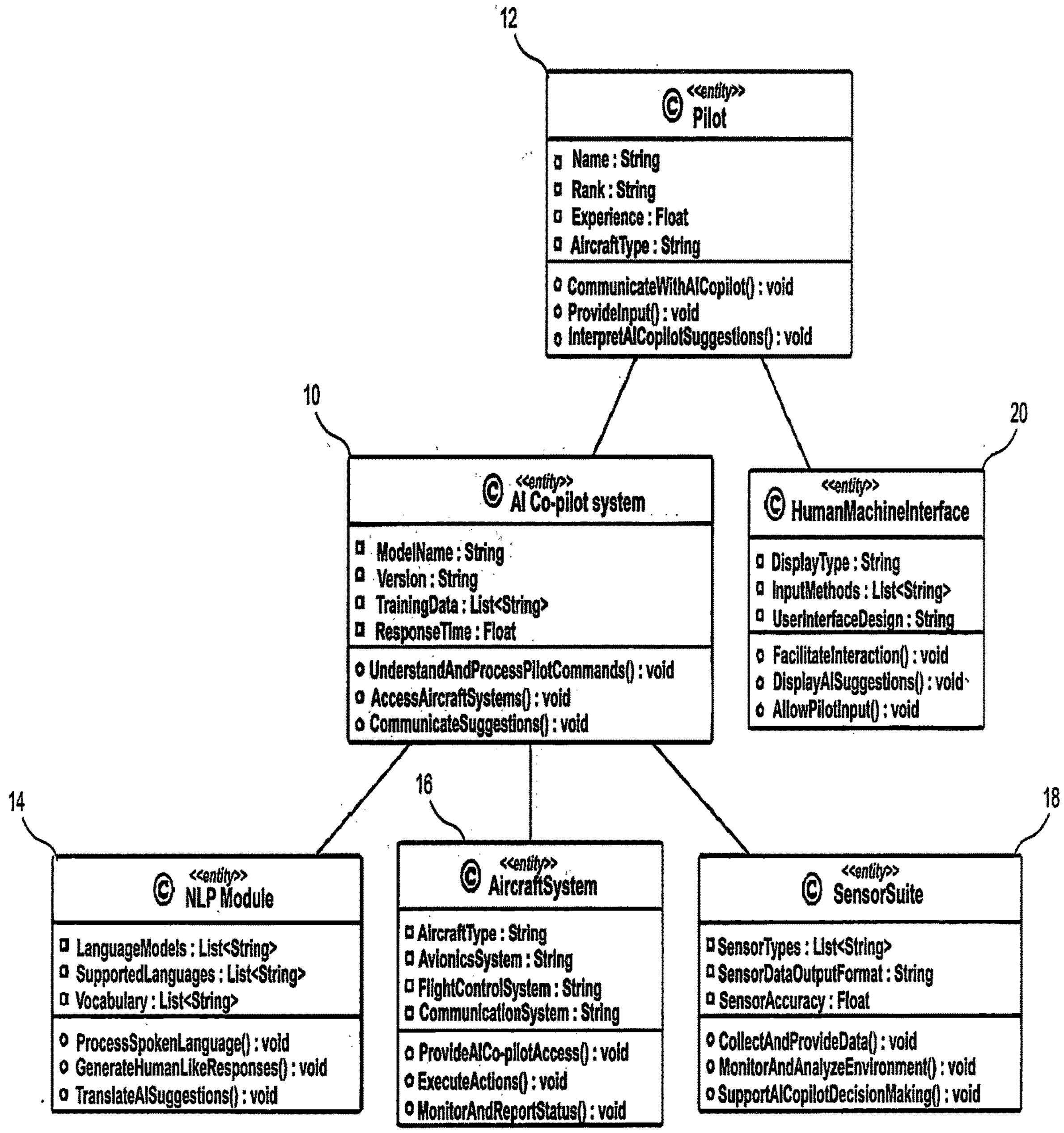
FIG. 3 is a domain model for an NLP model interacting with an aircraft pilot could involve the following six entities in accordance with an embodiment of the present invention.

The AI Co-Pilot Avionic system 10 key components and functional capabilities as shown in FIG. 3 are summarized herein:

1. Human-Machine Interface (HMI): The HMI 20 serves as the primary point of interaction between the pilot and the AI co-pilot system. It is responsible for receiving voice input from the pilot, processing and forwarding commands or inquiries to the AI Co-Pilot System and delivering voice output back to the pilot. The HMI ensures efficient communication and reduces the risk of misinterpretation. The alert(s) and/or advisory are provided to one or more output device(s) such as, but not limited to, audio devices, displays, autopilot computers, etc.
2. Natural Language Processing (NLP) Module: The NLP module 14 is a critical component that manages text input processing, response generation, and voice-to-text and text-to-voice conversions. It comprises several sub-components, including:
   a. Voice Recognition: This sub-component converts the pilot's voice input into text for further analysis and processing.
   b. Text Processing: This sub-component processes the text input, identifying relevant commands, inquiries, and associated parameters.
   c. Parsed Input: This class stores the parsed command or inquiry and its related parameters.
   d. Response Generation: This sub-component generates appropriate responses or executes requested actions based on the parsed input.
   e. Text-to-Speech: This sub-component converts the generated response text into voice output for the pilot.
3. AI Co-Pilot System: The AI Co-Pilot System is the core component that processes parsed input from the NLP module. It interacts with aircraft systems, sensors, and databases to execute commands or retrieve information based on inquiries. This system is designed to provide real-time decision support, reducing the potential for human error during complex and high-workload scenarios.

Figure 1:
FIG. 1 is a conceptual view of an AI system that can understand, interpret, and process complex scenarios in real-time, providing valuable assistance to human pilots in accordance with an embodiment of the present invention.
Figure 2:
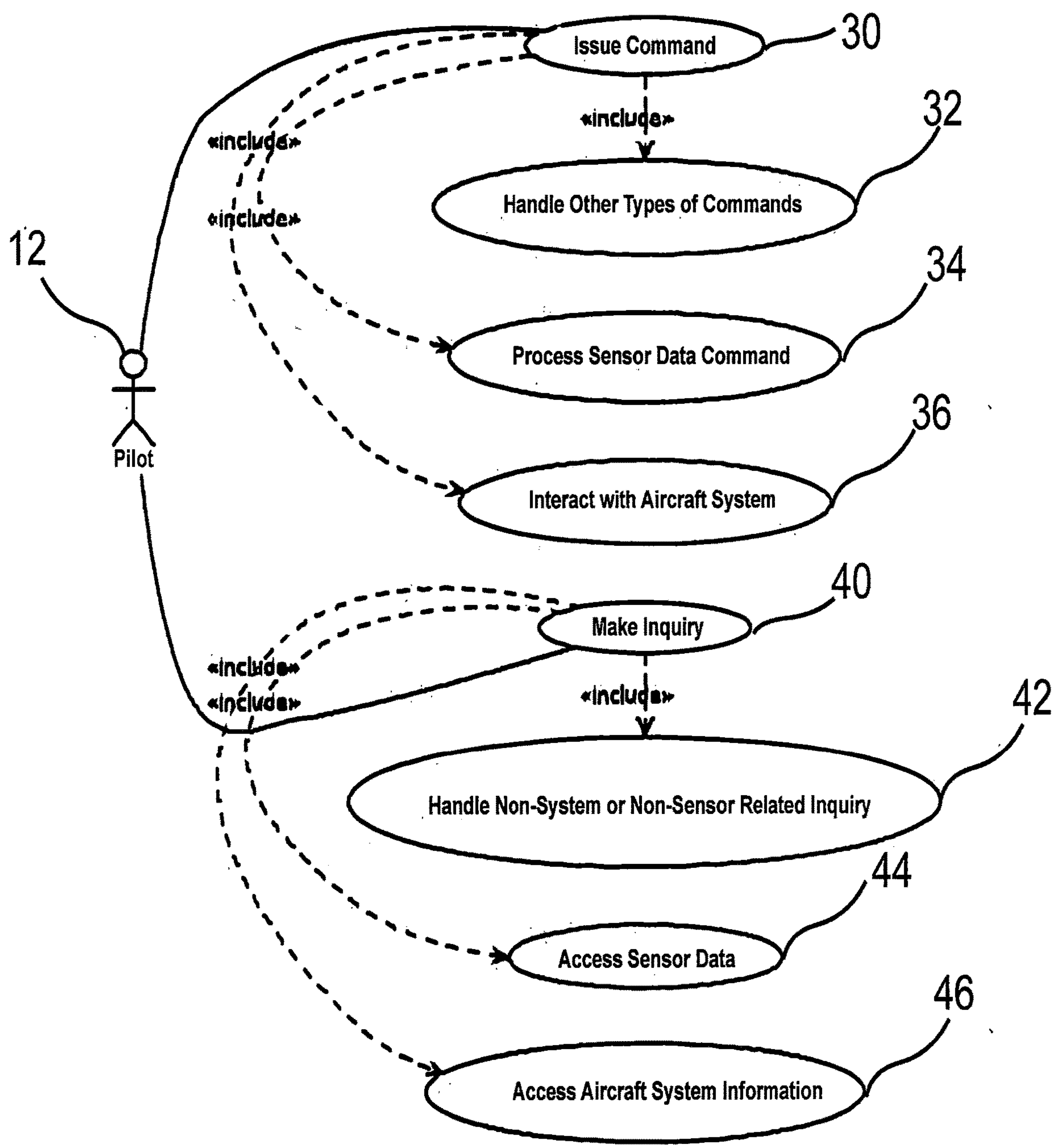
FIG. 2 is a use case diagram that represents a use case of a user (pilot) issuing a command or inquiry to the AI co-pilot in accordance with an embodiment of the present invention.
Figure 5:
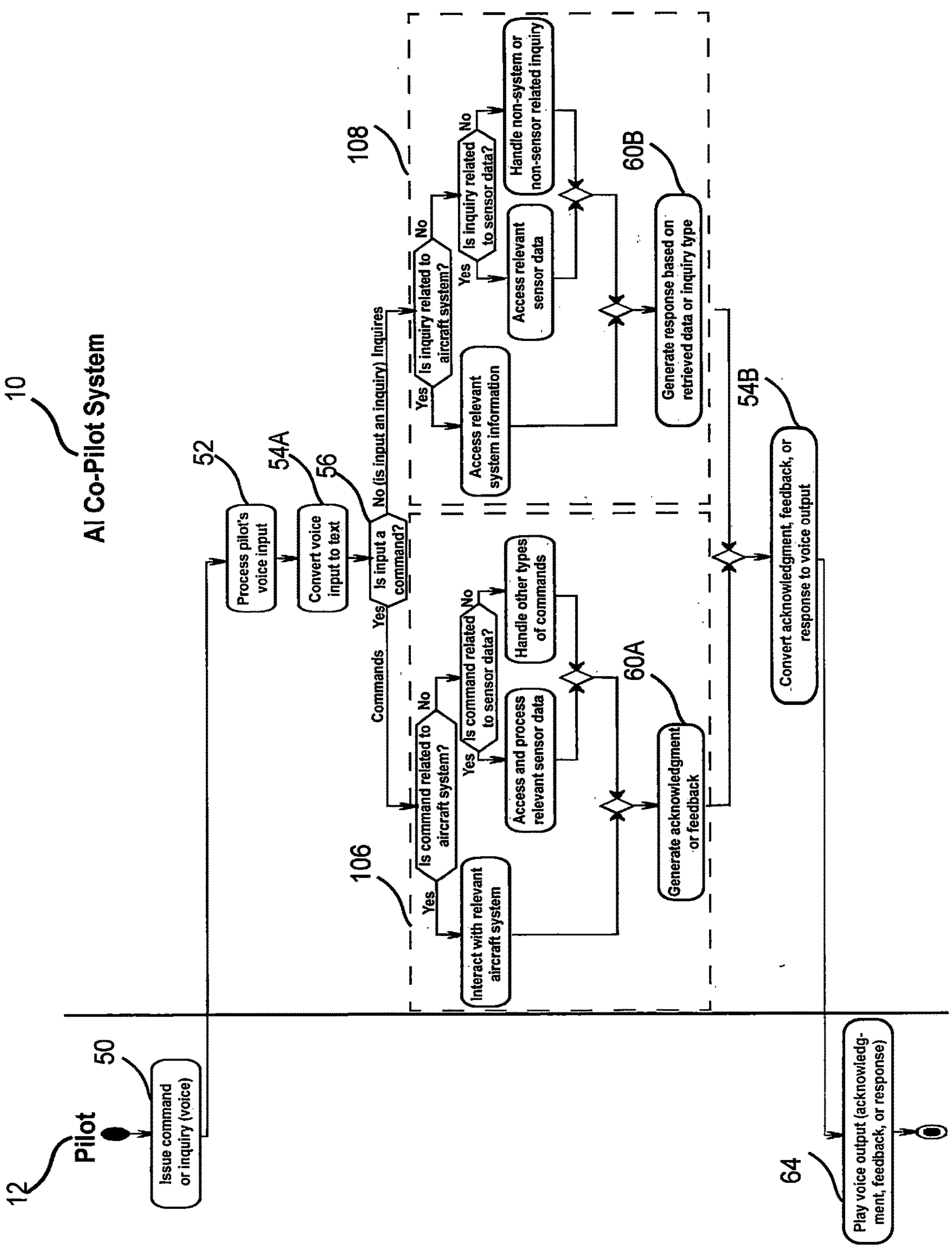
FIG. 5 is a conditional activity diagram that illustrates the flow of control and data within a system of a user (pilot) issuing a command or inquiry to the AI co-pilot in accordance with an embodiment of the present invention.
Figure 8:
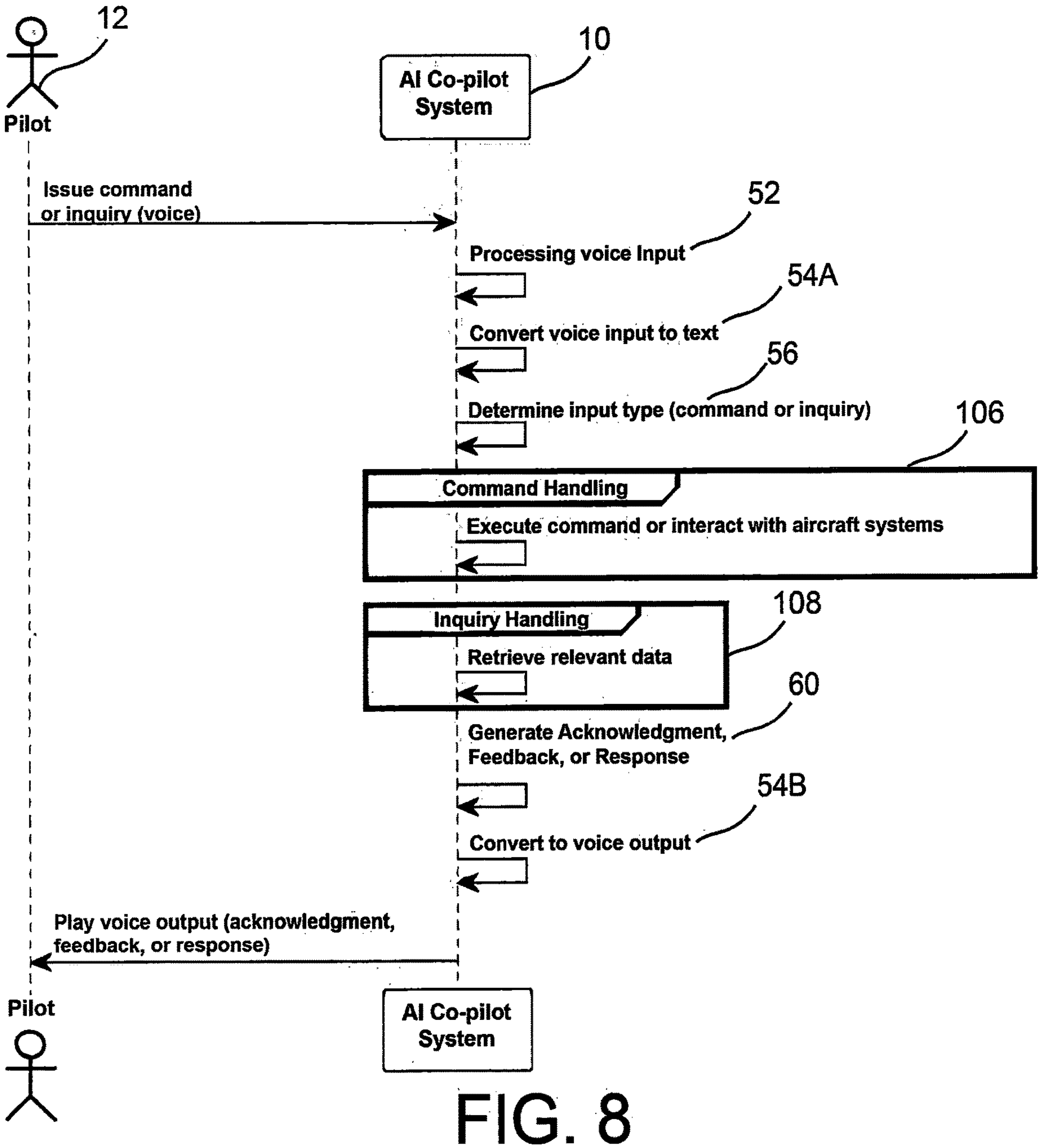
FIG. 8 is a recurrent activity diagram that models the behavior of the dynamic flow of the system from one task to another in response to events of a user (pilot) issuing a command or inquiry to the AI co-pilot in accordance with an embodiment of the present invention.

Main Use Cases: The AI Co-Pilot system main use cases are as shown in FIG. 2, FIG. 5, FIG. 8. As an example, the pilot commands "AI Copilot": "*Fly a GPS LPV Approach to the PMD airport using runway* 25" are summarized herein:

1. Voice to Text Conversion: The NLP module's Voice Recognition sub-component converts the pilot's voice input into text for further processing.
2. Text Processing: The NLP module processes the text input, extracting relevant commands or inquiries.
   a) *Fly a GPS LPV Approach to the PMD airport using Runway* 25.
3. Parse Command or Inquiry: The NLP module parses the extracted command or inquiry, along with any associated parameters, and creates a ParsedInput object.
   a) Command: "*Fly GPS LPV Approach to PMD runway* 25"
   b) Select GPS LPV Procedure and Approach to KMPD Airport
   c) Access RNAV 25 GPS LPV Approach plate.
   d) Load Approach & Activate Vectors.
4. Generate Response: Depending on the parsed command or inquiry, the AI Co-Pilot System interacts with aircraft systems, sensors, or databases to generate an appropriate response or perform the requested action.
   a) Command Execution: "*Fly GPS LPV Approach PMD Runway* 25"
   b) Interact with Aircraft System: "Checklist Database: Flaps, Gear Down, Local Altimeter setting."
   c) Interact with Aircraft System: "*Autopilot: Engaged*"
   d) Process Sensor Data: Monitor GPS system, annunciators, aircraft position and altitude.
   e) Interact with Aircraft System: Flying to the Final Approach Fix, descent to published altitude, heading and airspeed with autopilot.
5. Text to Voice Conversion: The NLP module's Text-to-Speech sub-component converts the generated response text into voice output for the pilot.
   a) "AI Copilot: Copies *Fly a GPS LPV Approach to PMD Runway* 25"
   b) "Checklist Complete: Flaps Down, Gear Down, Local Altimeter setting two niner niner two."
   c) "*Autopilot: Engaged*"
   d) "*Flying to the Final Approach Fix, descending to published altitude: four fife zero zero, heading: two fife four, airspeed: one tree zero and runway course two fife four.*"
   e) "Processing Sensor GPS data, flying the GPS lateral and vertical guidance with Autopilot system."
   f) "*Autopilot: Disengaged at MDA, your aircraft and have a safe landing.*"

The AI Co-Pilot System 10, with its integration of advanced NLP and HMI technologies, is designed to optimize aircraft operations, enhance safety measures, and mitigate the potential for human error in demanding and high-workload flight scenarios.

Figure 4:
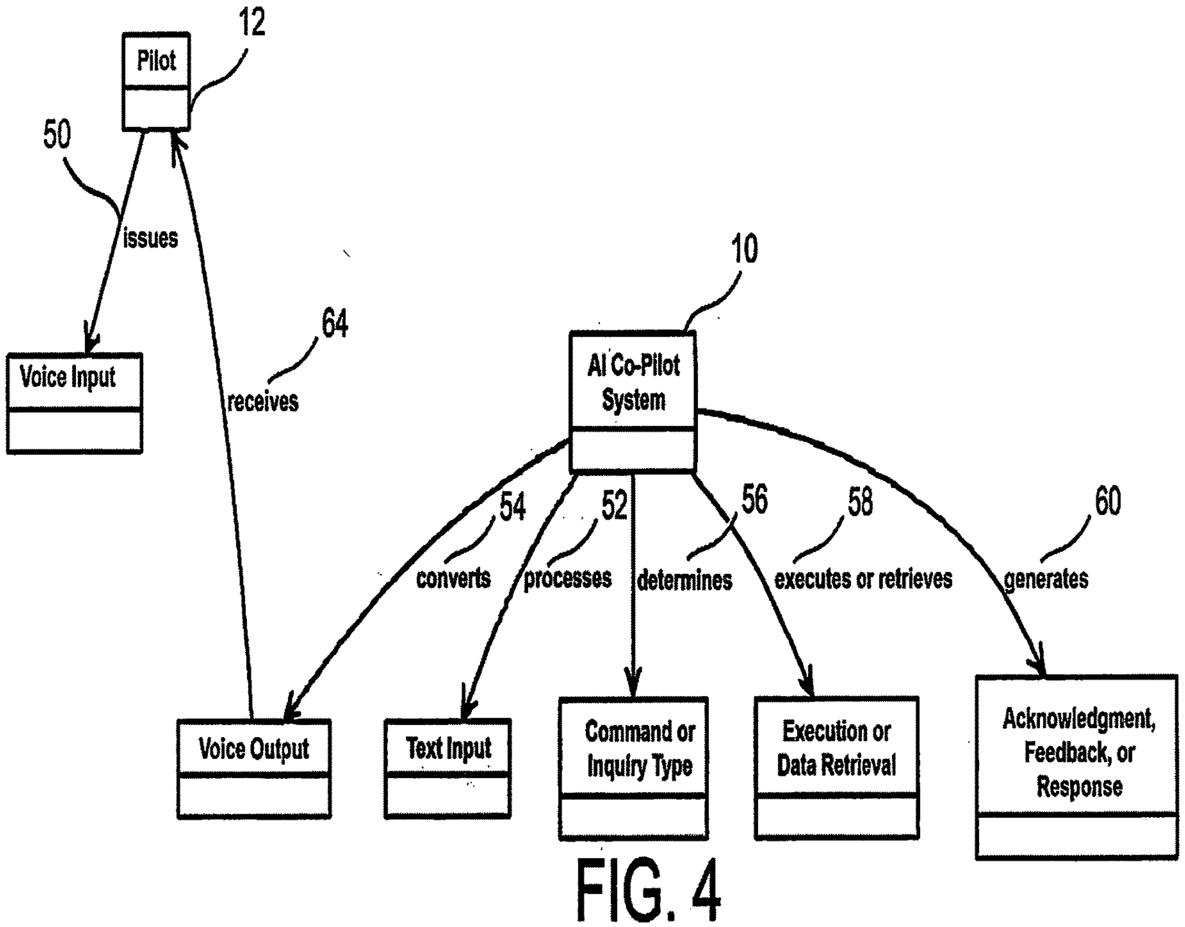
FIG. 4 is an object diagram that depicts the instances of classes and their relationships at a specific point in time of a user (pilot) issuing a command or inquiry to the AI co-pilot in accordance with an embodiment of the present invention.

The AI Co-Pilot System 10, as depicted FIG. 4, presents an object diagram that depicts instances of classes and their interrelationships at a specific moment when a pilot issues a command and/or inquiry to the AI Co-Pilot system 10. The pilot may issue 50 spoken commands or requests to the AI system 10. NLP 14 would allow the system to determine 56 and understand these commands, executes 58 them, and learn from them. For instance, a pilot 12 might say "*Set altitude to Flight Level Two Seven Zero*", and the AI system 10 could learn to associate this command with the appropriate flight control inputs.

The AI Co-Pilot System 10, as depicted in FIG. 5 is a conditional activity diagram of a pilot issuing a command and/or inquiry in accordance with an embodiment of the present invention The diagram demonstrates the actions and decisions involved in typical commands 106 or inquiries 108, from the pilot issuing a command or inquiry to receiving acknowledgment, feedback, or response through the AI co-pilot system. The diagram includes conditional branching to handle different types of commands and inquiries, such as those related to aircraft systems, sensor data, or handle non-system inquires.

Figure 6:
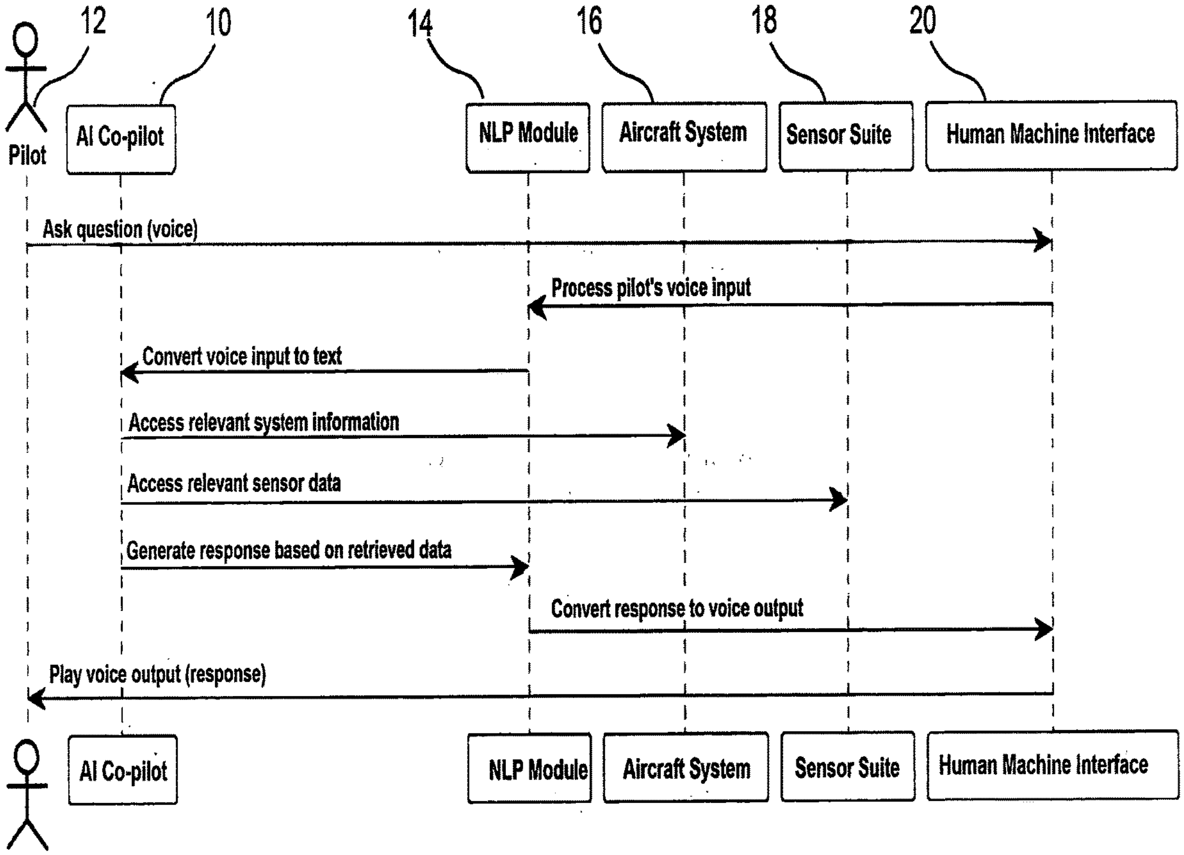
FIG. 6 is a sequence diagram that represents the interaction between objects in a time-ordered sequence of a user (pilot) issuing an inquiry to the AI co-pilot in accordance with an embodiment of the present invention.

The AI Co-Pilot System 10, as depicted in FIG. 6 sequence diagram, engages with the aircraft systems 16, sensor suite 18, and diverse databases when the pilot initiates an inquiry and various databases to implement commands and/or extract data based on the inquiries made. The diagram effectively captures the dynamic interaction among the pilot, AI Co-pilot 10, NLP module 14, aircraft system 16, sensor suite 18, and human-machine interface 20 during a routine inquiry process.

Figure 7:
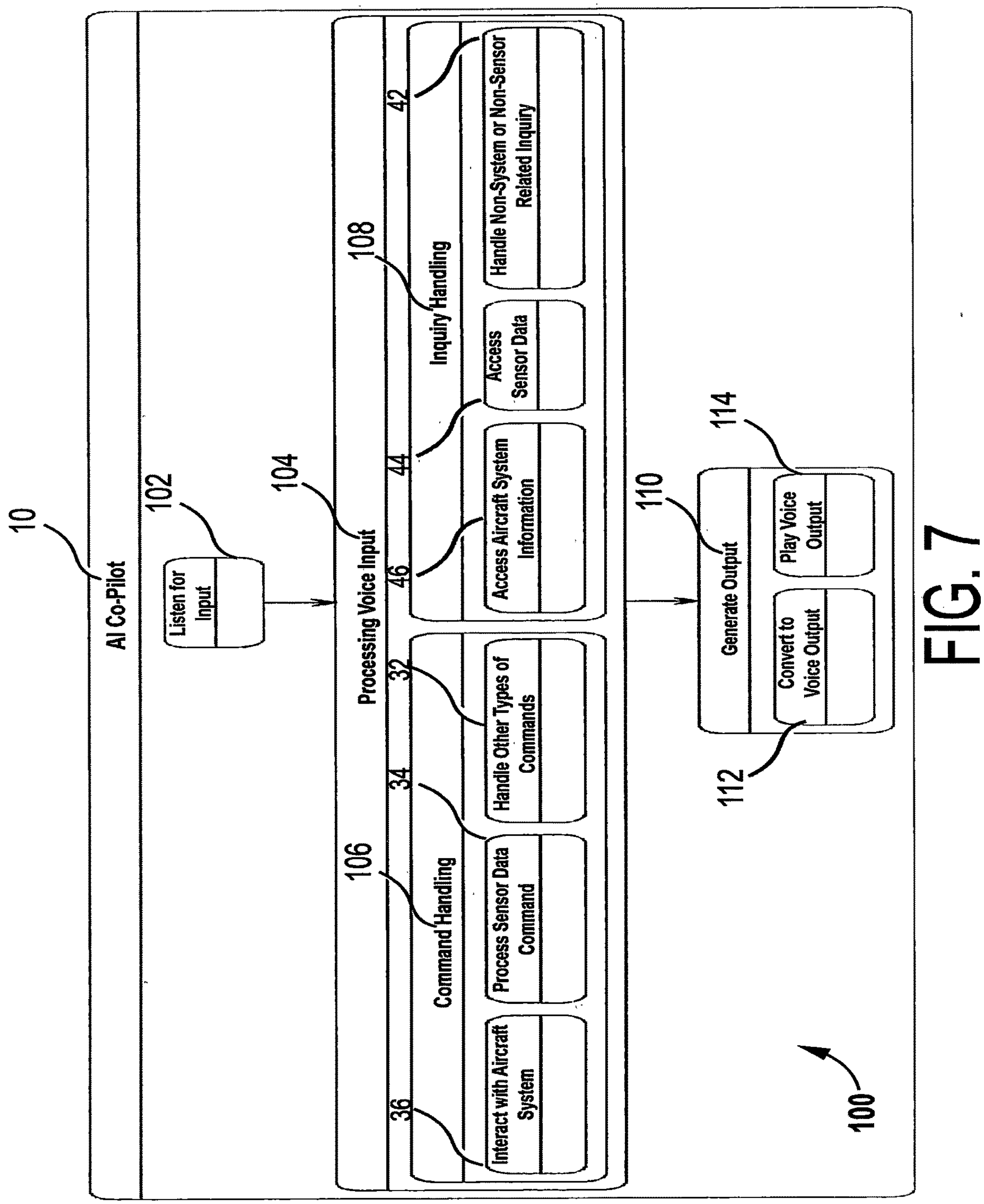
FIG. 7 is a concurrent state diagram that depicts the interactions of a user (pilot) issuing a command and/or inquiry to the AI co-pilot in accordance with an embodiment of the present invention.

The AI Co-Pilot System 10, as depicted in FIG. 7 is a concurrent state diagram of a pilot issuing a command and/or inquiry in accordance with an embodiment of the present invention. The diagram represents the AI Co-pilot's 10 concurrent states when processing a pilot command and/or inquiry. It shows the main states of listening for input 102, processing voice input 104 (with nested states for command 106 and inquiry handling 108) and generating output 110 (with nested states for converting and playing voice output). The concurrent states within the "Processing Voice Input" 104 and "Generate Output" 110 states represent the different types of commands and inquiries that can be handled by the AI co-pilot system.

The AI Co-Pilot System 10, represented in FIG. 8, is a recurrent activity diagram utilized to model the dynamic flow of the system from one task to another. This type of flow chart demonstrates the pilot's control sequence when issuing a command to the AI Co-pilot system 10, as outlined in one embodiment of the current invention. The diagram explicates the step-by-step actions occurring during a typical command exchange, from the initiation of the command by the pilot 12 to the receipt of acknowledgment or response 60 through the AI co-pilot system. Integral to the diagram is a loop mechanism (while), which represents the continuous handling of multiple commands 106 and/or inquiries 108 from the pilot.

Figure 9:
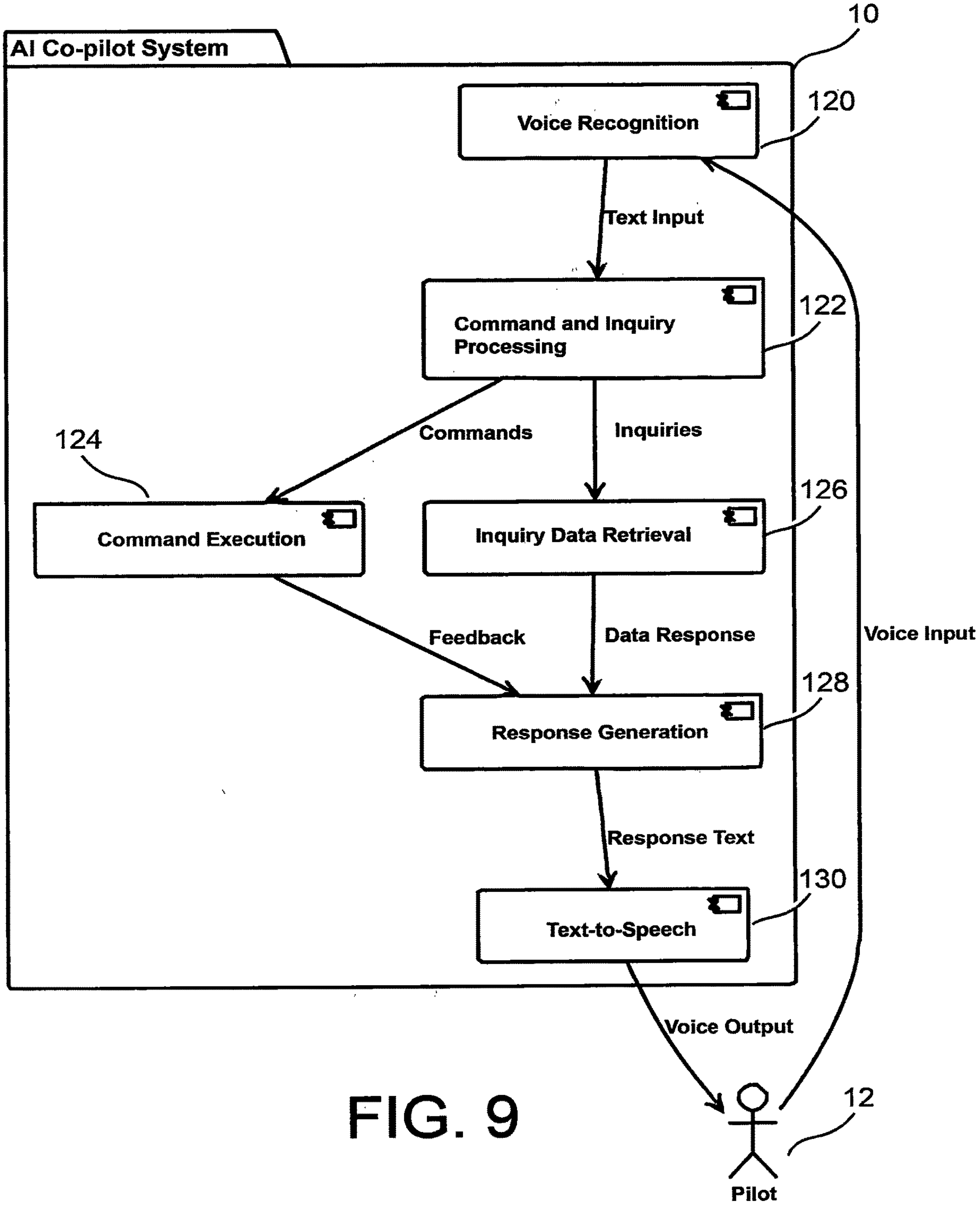
FIG. 9 is a component diagram that illustrates the organization and dependencies of a system's components, including software modules, libraries, and subsystems of a user (pilot) making a command to the AI co-pilot in accordance with an embodiment of the present invention.

The AI Co-Pilot System 10, as depicted in FIG. 9, the edge processor is architected to perform a plurality of functions for the implementation of the method delineated in subsequent sections. The voice recognition 120 and speech synthesis 130 systems are integrated within the aircraft's cockpit, enabling pilots to engage more intuitively and effectively with the avionics and other onboard systems. The FIG. 9 diagram demonstrates the system is organized into modular packages for handling pilot commands and/or inquiries, including voice recognition 120, command processing and inquiry processing 122, command execution 124, inquiry data retrieval 126, response generation 128, and finally text-to-speech 130 conversion to provide the voice output back to the pilot.

The AI Co-pilot system 10, depicted in FIG. 10 illustrates the system's deployment within an aircraft cockpit 140 and its integration with a cloud infrastructure 150. This deployment diagram encapsulates the interactions between the pilot 12, the AI Copilot system 10, interfaces to the aircraft's communication system 144, wireless data link 148, and an array of cloud services. Secure cloud infrastructure (e.g., Amazon or Azure Services) 150 enables voice-to-text and text-to-voice conversions, and data storage 152 for command and query processing and provides the extensive computing resources necessary for training and deploying the large language trained GPT-4 models into the flight operations.

The AI Co-Pilot system 10, illustrated in FIG. 11, is a package diagram that presents the system's structure, dependencies, and organization from a broader perspective. This package diagram, illustrating the deployment of the flight hardware apparatus, organizes the system's elements into related groups (packages) to handle complexity and enhance functionality.

The present invention uses an aviation trained NLP module 14 component that manages text input processing, response generation, and voice-to-text and text-to-voice conversions. Referring again to FIG. 12, a trained NLP that manages text input processing, response generation, and voice-to-text 120 and text-to-voice 130 conversions.

Training an NLP module to understand aviation-specific code words and terminology entails a combination of data collection, data preprocessing, model selection, and model training as shown in FIG. 13.

Methodology to train an NLP module for aviation code words and terminology:

1. Data Collection: Aviation datasets that includes examples of aviation code words, phrases, and terminology. These datasets contain conversations between pilots and air traffic controllers, aviation documents, manuals, and any other relevant text data. To build a robust NLP model for aviation, the datasets are diverse and comprehensive enough to cover various aspects of aviation code words, terminology, and communication styles.
   a) Aviation Safety Reporting System (ASRS) Database 202: The ASRS is a voluntary, confidential reporting system managed by NASA, which collects and analyzes safety incidents in aviation. The database contains narratives from pilots, air traffic controllers, and other aviation professionals about various safety-related incidents. This dataset is used for training an NLP model to understand aviation safety issues, terminology, and communication styles.
   b) Federal Aviation Administration (FAA) Datasets 204: The FAA provides various datasets related to aviation, including aircraft registration, accident and incident data, air traffic control data, and more. These datasets are useful for training NLP models for specific tasks within the aviation domain. (e.g., GPS LPV approach)
   c) ADS-B Exchange: ADS-B Exchange is a platform that collects and shares Automatic Dependent Surveillance-Broadcast (ADS-B) data from aircraft. This dataset includes real-time aircraft positions, flight paths, and other flight-related information. This data is used to train NLP models on various aspects of aircraft operations and flight data processing.
2. Data Preprocessing: Clean and preprocess the data 208 to ensure the NLP model can effectively learn from it. FIG. 13, preprocessing steps include:
   a. Tokenization 210: Split the text into words or tokens.
   b. Lowercasing 212: Convert all text to lowercase for consistency.
   c. Stop word removal 214: Remove common words that don't provide much context or meaning (e.g., "the", "is", "and").
   d. Lemmatization or stemming 218: Reduce words to their base form (e.g., "flying"→"fly").
   e. Handling special terms 216: Identify and preprocess specific aviation code words and terminology, such as abbreviations or jargon.
   f. Creating a vocabulary: Generate a list of unique words or tokens present in the dataset.
   g. The dataset is split into training ~80% (38.7 k rows, validation ~20% 4.3 k, and testing 4.7 k subsets.
3. Model Selection: The advanced ChatGPT 4 NLP model was selected because of the larger number of parameters, which results in better text generation and understanding capabilities. The CHATGPT 4 model incorporates new training techniques such domain-specific fine-tuning for more efficient and effective domain-specific fine-tuning, allowing users to adapt the model to the aviation industries or tasks with higher precision.

4. Model Fine-Tuning 220: Transfer learning by leveraging a pre-trained CHATGPT 4 model and fine-tuning it with the aviation specific ASRS dataset. This approach was used to reduce the training time and resources needed while improving the model's performance.
   a. The pre-trained CHATGPT 4 model loads and initializes with the model weights from the pre-training phase.
   b. The model is fine-tuned using the training subset of the ASRS dataset, adjusting the learning rate, batch size, and other hyperparameters as needed.
   c. Train the ChatGPT 4 NLP model on the preprocessed aviation dataset and evaluate the model's performance using the validation subset to prevent overfitting and tune the model's hyperparameters.
5. Model Evaluation and Hyperparameter Tuning 230 Evaluate the trained model on the test set and identify any areas for improvement. Perform hyperparameter tuning to optimize the model's performance. This step may involve adjusting the learning rate, batch size, number of layers, or other model-specific parameters.
   a. After fine-tuning, evaluate the CHATGPT 4 model's performance on the test subset of the ASRS dataset, measuring metrics like accuracy, precision, recall, and F1-score.
   b. Analyze the results and identify areas for improvement. If necessary, refine the model by iterating through the fine-tuning and evaluation steps.
   c. Monitor the model's performance using metrics such as accuracy, precision, recall, and F1-score.
6. Model Integration:
   a. Once the CHATGPT 4 model achieves satisfactory performance, the AI Co-Pilot System Developer integrates the fine-tuned model into Processor the AI Co-Pilot System.
   b. The AI Co-Pilot System Developer tests the system to ensure the NLP module performs as expected, effectively understanding and processing aviation-specific information from the ASRS, FAA, ADS-B dataset.
7. System Deployment and Continuous Improvement: Deploy the trained NLP module 14 as part of the AI Co-Pilot System 10. Continuously monitor its performance in real-world scenarios and gather pilot feedback to improve the model. Periodically retrain the model with updated datasets and any new aviation code words to ensure it remains accurate and relevant.
   a. The AI Co-Pilot System, equipped with the fine-tuned CHATGPT 4 NLP module, is deployed for real-world usage.
   b. The Data Scientist and AI Co-Pilot System Developer monitor the system's performance and gather feedback from users to improve the NLP module further.
   c. The model is periodically retrained with updated ASRS data and any new aviation code words or terminology to ensure it remains accurate and relevant.

The result is a fine-tuned CHATGPT 4 NLP module that effectively understands and processes aviation-specific code words and terminology, enhancing the performance of the AI Co-Pilot System 10:

The CHATGPT 4 model is successfully fine-tuned with the ASRS dataset and integrated into the AI Co-Pilot System.

The AI Co-Pilot System can understand and process aviation-specific language, communication methods, and safety issues effectively.

As mentioned above, fine-tuned CHATGPT 4 NLP in the AI Co-Pilot system 10 could have more extensive multilingual support, potentially understanding and generating content in a more significant number of languages. It also integrates multimodal learning, enabling the model to process and generate not just text, but also visual and auditory information. Referring additionally now to FIG. 9, FIG. 10 and FIG. 11, a component, deployment, and package diagram is illustrated in accordance with an embodiment of the present invention. The CHATGPT 4 NLP module allows the network processing to be efficiently integrated with voice recognition, text to speech, and graphics processing used for image generation that are to be displayed on one or more output devices.

In the AI Co-Pilot System 10, the processor is designed to execute multiple functions to implement the method described in further detail below. As shown in FIG. 9, the voice recognition and speech synthesis systems are seamlessly integrated into the aircraft's cockpit. This integration enables pilots to interact more intuitively and efficiently with avionics and other systems on board.

In accordance with an embodiment of the present invention, the processor is capable of handling voice recognition, text-to-speech conversion, text prompts, graphics processing, and command execution. This functionality allows the processor to interact with aircraft systems, process commands and inquiries, and work in conjunction with its CPU(s) and GPU(s).

The deployment kit is employed to integrate the fine-tuned ChatGPT 4 model into the AI Co-pilot System, as illustrated in FIG. 9's AI Co-pilot Component Diagram and FIG. 10's Deployment Diagram.

The deployment flight certified hardware and software comprise:

Flight Hardware kit: Commercial module Jetson AGX Orin 64 GB Module or Industrial module Jetson AGX Xavier Peripherals and accessories: Additional peripherals and accessories, such as noise-cancelling microphone, headsets, cameras, sensors, or large flash storage devices.

Software licenses: AI development tools, or libraries.

The alert(s) and/or advisory are provided to one or more output HMI device(s) 70 such as, but not limited to, audio devices, touch interfaces, and graphical, displays, autopilot computers, etc.

The advantages of the present invention are numerous. The AI copilot method and system described herein will integration of advanced NLP and HMI technologies and is designed to optimize aircraft operations, enhance safety measures, and mitigate the potential for human error in demanding and high-workload flight scenarios.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described. Additionally, as used herein, the term 'voice recognition' is intended to mean 'speech recognition,' that is, technology for interpreting and converting spoken language into textual commands or structured data. This clarification ensures technical alignment with industry-standard terminology.

What is claimed is:

1. An Artificial Intelligence (AI) Co-Pilot system designed to assist human pilots to aviate, navigate, communicate, and manage aircraft operations, comprising:

a. a speech recognition module configured to receive and process voice commands from a pilot;

b. a speech synthesis module configured to generate audible feedback and responses for the pilot;

c. a natural language processing module, comprising an augmented fine-tuned large language transformer model (LLM) trained to contextually understand, process, and generate responses to aviation-specific language, communication methods, and safety issues by utilizing contextual information derived from ongoing pilot conversations and stored aviation safety datasets;

d. a processor configured to manage speech recognition, text-to-speech conversion, text prompt generation, graphics processing, and command execution;

e. an interface configured for integrating the AI Co-Pilot system with the aircraft's avionics and other systems;

f. a training module configured to preprocess aviation specific-training data and fine-tune the LLM; and g. a deployment flight hardware kit configured to integrate the fine-tuned LLM transformer model into the AI Co-Pilot system.

2. The AI Co-Pilot system of claim 1, wherein the speech recognition module and speech synthesis module are integrated into the aircraft's cockpit to enable seamless and efficient interaction between the pilot and aircraft systems.

3. The AI Co-Pilot system of claim 1, wherein the natural language processing module comprises an augmented fine-tuned LLM transformer model, configured to interpret commands and/or inquiries from the pilot and to provide real-time decision support by leveraging data from the sensor suite to reduce the potential for human error.

4. The AI Co-Pilot system of claim 1, wherein the processor comprises CPU(s) and GPU(s) for efficient processing of speech recognition, text-to-speech conversion, text prompts, graphics processing, and command execution.

5. The AI Co-Pilot system of claim 1, wherein the training module is implemented in a cloud computing infrastructure and utilizes Aviation Safety Reporting System (ASRS) and Federal Aviation Administration (FAA) datasets for preprocessing, training, and fine-tuning the LLM transformer model.

6. The AI Co-Pilot system of claim 1, wherein the deployment flight hardware kit is configured to seamlessly integrate the fine-tuned LLM transformer model into the AI Co-Pilot system, thereby enhancing the system's capacity to comprehend and process aviation-specific information.

7. A method for deploying an AI Co-Pilot system for an aircraft, comprising:

a. integrating a speech recognition module and a speech synthesis module into the aircraft's cockpit;

b. preprocessing an aviation-specific dataset and fine-tuning an LLM transformer model using a cloud computing infrastructure;

c. deploying the fine-tuned LLM transformer model into the AI Co-Pilot system using onboard flight hardware to enable real-time onboard processing independent from external networks;

d. interpreting voice commands from a pilot and generating audible feedback and operational responses using the onboard AI Co-Pilot system in real-time during flight operations; and e. providing real-time decision support to the pilot through the natural language processing module.

* * * * *